United States Patent
Singh et al.

(10) Patent No.: US 11,816,183 B2
(45) Date of Patent: Nov. 14, 2023

(54) METHODS AND SYSTEMS FOR MINING MINORITY-CLASS DATA SAMPLES FOR TRAINING A NEURAL NETWORK

(71) Applicant: HUAWEI CLOUD COMPUTING TECHNOLOGIES CO., LTD., Gui'an New District (CN)

(72) Inventors: Gursimran Singh, Delta (CA); Lingyang Chu, Burnaby (CA); Lanjun Wang, Toronto (CA); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 375 days.

(21) Appl. No.: 17/119,989

(22) Filed: Dec. 11, 2020

(65) Prior Publication Data

US 2022/0188568 A1    Jun. 16, 2022

(51) Int. Cl.
*G06N 3/08* (2023.01)
*G06F 18/214* (2023.01)
(Continued)

(52) U.S. Cl.
CPC ...... *G06F 18/2148* (2023.01); *G06F 18/2155* (2023.01); *G06N 3/045* (2023.01); *G06N 3/084* (2013.01)

(58) Field of Classification Search
CPC .......... G06N 3/045; G06N 3/084; G06N 3/08; G06N 3/04; G06N 3/0454; G06F 18/2148;
(Continued)

(56) References Cited

U.S. PATENT DOCUMENTS

2019/0130277 A1* 5/2019 Andoni ................. G06N 3/086
2021/0326749 A1* 10/2021 Velizhev ............... G06N 20/00

FOREIGN PATENT DOCUMENTS

| CN | 111079841 A | 4/2020 |
|---|---|---|
| CN | 111259861 A | 6/2020 |
| CN | 111340174 A | 6/2020 |

OTHER PUBLICATIONS

Attenberg, Josh, and Foster Provost. "Why label when you can search? Alternatives to active learning for applying human resources to build classification models under extreme class imbalance." Proceedings of the 16th ACM SIGKDD international conference on Knowledge discovery and data mining 2010.
(Continued)

*Primary Examiner* — Tuan H Nguyen

(57) ABSTRACT

Methods and systems for mining minority-class data samples are described. A minority-class mining service receives activations generated by an inner-layer of a client neural network that has been trained to perform a prediction task that involves classification. The minority-class mining service generates a recalibrated activation using a recalibration neural network, and generates an anomaly detector output using an anomaly detector. From the anomaly detector output, a minority-class score is computed for the data sample represented by a received activation. The computed minority-class score is compared against a minority-class threshold to identify a candidate minority-class data sample. The candidate minority-class data sample can then be labeled and added to the training dataset for the client neural network.

20 Claims, 4 Drawing Sheets

(51) Int. Cl.
*G06N 3/084* (2023.01)
*G06N 3/045* (2023.01)

(58) Field of Classification Search
CPC .... G06F 18/2155; G06K 9/62; G06K 9/6257; G06K 9/6259
See application file for complete search history.

(56) References Cited

OTHER PUBLICATIONS

Kazerouni, Abbas, et al. "Active Learning for Skewed Data Sets." arXiv preprint arXiv:2005.11442 2020.

\* cited by examiner

METHODS AND SYSTEMS FOR MINING MINORITY-CLASS DATA SAMPLES FOR TRAINING A NEURAL NETWORK

FIELD

The present disclosure relates to training of a neural network, in particular methods and systems for mining minority-class data samples from a data source to identify minority-class data samples that are to be added to a training dataset that is used for training a neural network.

BACKGROUND

A neural network is often trained, in a supervised fashion (i.e. using a supervised learning algorithm), to perform a prediction task that involves classification (e.g., object detection, semantic segmentation, image classification, etc.). The neural network is trained using a training dataset that includes labeled data samples, to learn parameters of the neural network, in which each label corresponds to at least one class in a set of classes. The trained neural network may be deployed and used, in an inference phase, to generate predictions (e.g. predict classes) for unlabeled data samples. The performance of the trained neural network when generating predictions for unlabeled data samples typically depends on the quality of the labeled data samples in the training dataset. However, in many real-life applications (e.g., medical diagnosis), the class distribution of labeled data samples in the training dataset (i.e., the distribution of labeled data samples representing different class labels) can be skewed, for example there may be a long-tail class distribution. The result of training a neural network using a training dataset whose class distribution of labeled data samples is skewed is that the trained neural network has suboptimal performance when generating predictions for data samples belonging to the minority classes (i.e., statistically-rare classes having a very limited number of data samples and occurring towards the end of the long-tail of the class distribution of labeled data samples in the training dataset). The ability of a trained neural network to generate accurate predictions for unlabeled data samples in the minority classes is often important in many applications like medical diagnosis, spam detection, and fraud detection.

A way to address this problem is to balance the class distribution of labeled data samples in the training dataset by mining for data samples belonging to underrepresented classes (also referred to as minority-classes, or tail-classes) from the unlabeled data stream of examples, obtaining labels for the mined unlabeled data samples (e.g., using human labelers), and augmenting the training dataset with the newly mined and labeled data samples. Since the class distribution of data samples in the unlabeled data stream is also similarly skewed, any pool of data samples that are mined for labeling by a naive method, like random sampling, is similarly skewed and obtains a few data samples belonging to the minority-classes. Hence, a lot of money and effort is wasted in labeling majority-class data samples which are already in abundance and is not what is needed to improve the performance of the trained neural network in generating predictions for unlabeled data samples. Similarly, many common computer-based methods for automatically mining data samples from the unlabeled data stream, such as those based on exploiting a trained neural network's uncertainty (for example max score and entropy), have been shown to be quite ineffective when it comes to mining minority-class data samples. In fact, in data having a highly skewed class distribution, these methods have been shown to perform worse than random sampling.

Accordingly, it would be useful to provide a more effective method and system for computer-based mining of minority-class data samples.

SUMMARY

In various examples, the present disclosure describes methods and systems for mining of minority-class data samples from a data that lacks minority-class labels (e.g., unlabeled data) to identify candidate minority-class data samples. The disclosed methods and systems use neural networks to automate identification of minority-class data samples from data that lacks minority-class labels. The identified minority-class data samples can be labeled (e.g., using a human labeler) and added to a training dataset, to correct for skew in the class distribution of the labeled data samples in the training dataset.

The disclosed methods and systems may be implemented as software-as-a-service (e.g., software that is provided as a service by a cloud computing platform, or a network server) that is accessible by multiple different clients each having one (or more) client neural network that is trained to perform a prediction task that involves classification. Each client may retain ownership of and data privacy over their own training dataset and/or client neural network.

The disclosed methods and systems make use of a trained recalibration neural network (e.g., a single-layer recalibration neural network) and a trained anomaly detector (e.g., an autoencoder). The anomaly detector is configured to identify activation-patterns corresponding to majority-class data samples, and flag aberrant minority-class data samples as anomalies. The recalibration neural network is configured to recalibrate the distorted activations of the client neural network (due to any potential overfitting) and makes them more amenable to be modelled by anomaly detection. The use of a trained anomaly detector may be considered an approach that is more tuned to a particular training dataset of the client neural network, rather than the use of a hard-coded metric (such as entropy or max score).

The disclosed methods and systems may enable more effective and efficient mining of minority-class data samples from highly-skewed data distributions, compared to existing computer-based methods and systems. The disclosed methods and systems may also be computationally and financially less expensive than existing approaches for mining minority-class data samples. Further, unlike existing approaches for mining minority-class data samples, the disclosed methods and systems is expected to be effective irrespective of the domain, size or dimensionality of the data in the data source to be mined (i.e., a source of data lacking in minority-class labels, such as an unlabeled data pool or data stream). The technical effect of the disclosed methods and systems is that a training dataset with a skewed class distribution can be improved using computer-based mining of minority-class data samples, with the result that a neural network trained using the new training dataset (the training dataset including additional labeled minority-class data samples) is able to generate better predictions for unlabeled data samples from the minority class during an inference phase.

In some example aspects, the present disclosure describes a method for identifying a candidate minority-class data sample. The method includes: receiving an activation comprising values of an inner-layer activation representing a given data sample, the received activation being generated by a client neural network that has been trained to perform a prediction task that involves classification; forward propagating the received activation through a trained recalibration neural network, to generate a recalibrated activation, wherein the trained recalibration neural network has been trained to perform the prediction task that involves classification in a manner to avoid overtraining; forward propagating the recalibrated activation through a trained anomaly detector, wherein the trained anomaly detector has been trained on activations in which majority-class data samples form a majority; computing a minority-class score for the received activation, based on an anomaly detector output; identifying the given data sample as a candidate minority-class data sample, based on a comparison of the minority-class score against a minority-class threshold; and communicating an identification of the given data sample as the candidate minority-class data sample.

In any of the preceding example aspect, there may be a plurality of received activations representing the given data sample, and for each respective received activation of the plurality of received activations the method may include: forward propagating the respective received activation through the trained recalibration neural network, to generate a respective recalibrated activation; forward propagating the respective recalibrated activation through the trained anomaly detector, to generate a respective anomaly detector output; and computing a respective minority-class score for the respective received activation, based on the respective anomaly detector output. The method may also include: filtering and aggregating the respective minority-class scores computed for the plurality of received activations to obtain a single minority-class score to be used in the comparison against the minority-class threshold.

In any of the preceding example aspects, the trained anomaly detector may be a trained autoencoder that has been trained to output a reconstructed activation as the anomaly detector output, and the respective minority-class score may be computed based on a quality of the respective reconstructed activation.

In any of the preceding example aspects, the received activation may be received from a client computing system, and the minority-class threshold may be received from the client computing system.

In any of the preceding example aspects, the identification of the given data sample as the candidate minority-class data sample may be communicated to the client computing system.

In any of the preceding example aspects, the identification of the given data sample as the candidate minority-class data sample may be communicated to a labeling service.

In any of the preceding example aspects, the trained anomaly detector may be a trained autoencoder that has been trained to perform a reconstruction task, the anomaly detector output may be a reconstructed activation, and computing the minority-class score may include: computing a mean square error between the received activation and the reconstructed activation, wherein the computed mean square error may be used as the minority-class score.

In any of the preceding example aspects, a softmax function may be applied to the received activation and to the reconstructed activation, prior to computing the mean square error.

In any of the preceding example aspects, the method may include training the recalibration neural network and the anomaly detector, the anomaly detector being an autoencoder, by: receiving a set of inner-layer activations generated by the client neural network, and a set of corresponding class labels, each class label being associated with a respective inner-layer activation. Training the recalibration neural network using a subset of training activations, from the set of inner-layer activations, may include: for each training activation, forward propagating the training activation through the recalibration neural network to generate a predicted class label; computing a focal loss using the predicted class label, the corresponding class label associated with the training activation, and a focal loss function; and updating weights of the recalibration neural network by backpropagating the computed focal loss. Training the autoencoder using a set of recalibrated training activations generated by the recalibration neural network from the subset of training activations, may include: for each recalibrated training activation, forward propagating the recalibrated training activation through the autoencoder to generate a reconstructed training activation; computing a reconstruction loss using the reconstructed training activation, the recalibrated training activation, and a reconstruction loss function; and updating weights of the autoencoder by backpropagating the computed reconstruction loss.

In any of the preceding example aspects, training of the recalibration neural network may be performed for a reduced number of epochs compared to training of the client neural network.

In any of the preceding example aspects, the method may include computing the minority-class threshold by: forward propagating a subset of validation activations, from the set of inner-layer activations, through the trained recalibration neural network and the trained autoencoder to obtain a set of reconstructed validation activations; computing a set of minority-class scores based on quality of reconstruction of the set of reconstructed validation activations; pairing each minority-class score with a corresponding class label; and identifying, from the pairings, a numerical value for the minority-class threshold representing a boundary between the minority-class score for a minority-class data sample and the minority-class score for a majority-class data sample.

In any of the preceding example aspects, the computed minority-class threshold may be communicated to a client computing system.

In some example aspects, the present disclosure describes a device including a processor configured to execute instructions to cause the device to perform any of the methods described above.

In any of the preceding example aspects, the computing system may be one of: a server; a server cluster; or a cloud computing platform.

In some example aspects, the present disclosure describes a computer readable medium having instructions stored thereon, wherein the instructions, when executed by a processing device of a computing system, cause the computing device to perform any of the methods described above.

In some example aspects, the present disclosure describes a computer program having instructions, wherein the instructions, when executed by a processing device of a computing system, cause the computing system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
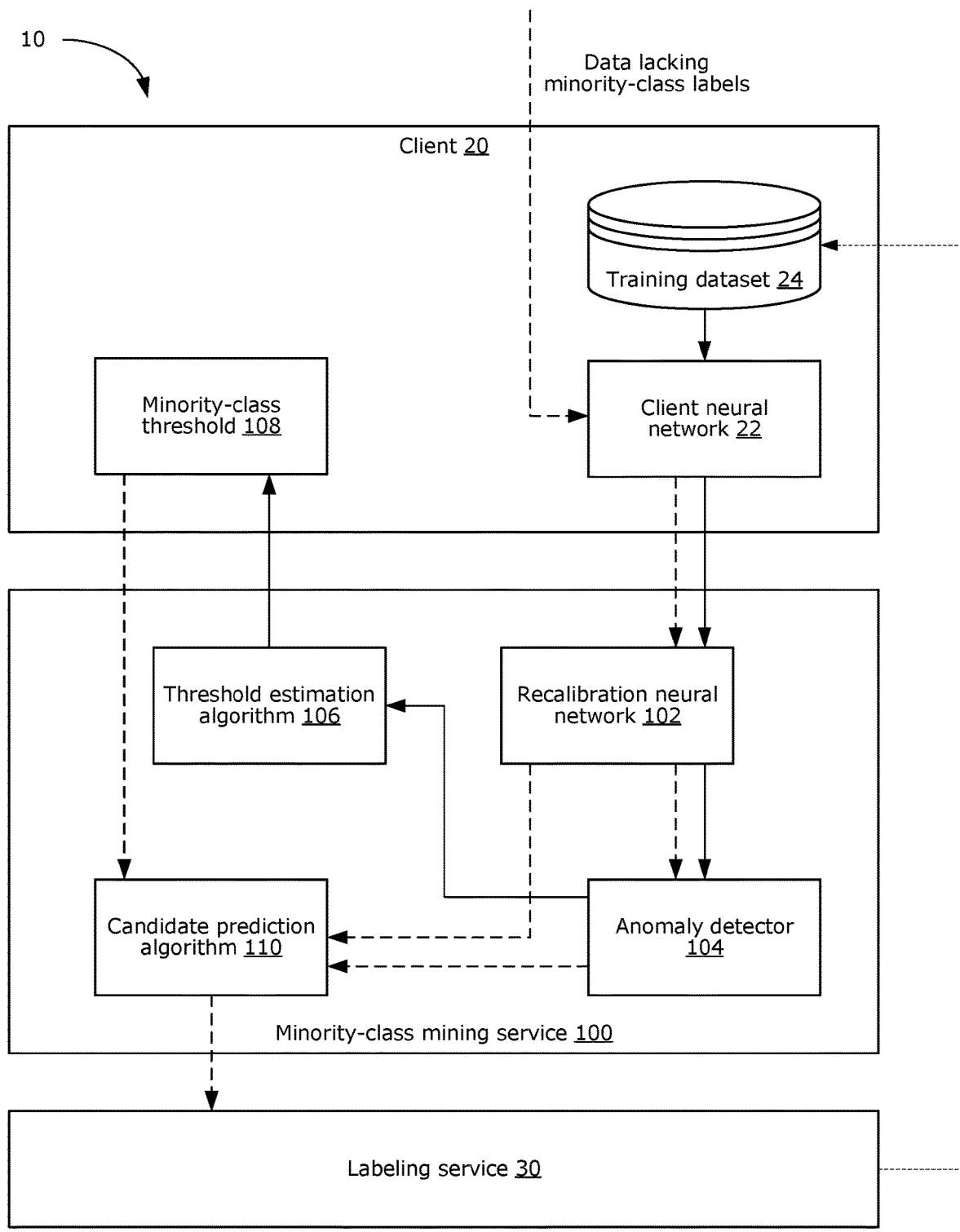
FIG. 1 is a block diagram showing an example system, including a client and a minority-class mining service, in accordance with examples of the present disclosure.

The following describes technical solutions of this disclosure with reference to accompanying drawings.

The methods and systems described in examples herein may be applied to any scenario in which data mining is used to augment a training dataset. In particular, the methods and systems described in examples herein may be applied to any scenario in which the training dataset has a skewed class distribution (i.e., at least one class, referred to as a minority-class, is underrepresented in the training dataset). In the disclosed methods and systems, a minority-class data mining service is provided, which is implemented using a trained recalibration neural network (e.g., a single-layer recalibration neural network), a trained anomaly detector (e.g., an autoencoder), and a threshold estimation algorithm. The minority-class data mining service may be accessible by a client who owns a trained neural network (i.e., a neural network that has been trained, using a supervised learning algorithm and a training dataset), to perform a prediction task that involves classification, referred to herein as the client neural network. The recalibration neural network and anomaly detector are neural networks, which are trained using activations from an inner-layer (e.g., penultimate layer activations) of the client neural network. The minority-class data mining service uses a learned threshold to identify minority-class data samples, from data that lacks minority-class labels (e.g., data that is unlabeled, or data that is labeled but minority-class labels were not considered in the previous labeling, or data that might have been mislabeled, etc.), that can be labeled and used to augment the training dataset, to improve performance of the client neural network.

To assist in understanding the present disclosure, some existing methods and systems for finding minority-class data samples are first discussed. In the following discussions, consider a neural network that has been trained in a supervised manner on a training dataset). The data samples (e.g., 2D images) in the training dataset are labeled data samples (e.g., each 2D image is associated with at least one ground-truth class label). There may be a class imbalance in the training dataset, such that there is a set of one or more classes (referred to herein as minority-classes) that are underrepresented in the training dataset. By underrepresented, it is meant that labeled data samples with minority-class labels are statistically rare in the training dataset. The labeled data samples in the training dataset may be referred to as having a class distribution imbalance or having a skewed class distribution. Data samples that represent the minority-class may be referred to as minority-class data samples hard data samples (or hard examples), because it is harder for the neural network to learn latent features from such data samples (due to their statistical rarity). The neural network that is trained on a skewed training dataset (i.e. a training dataset that includes labeled data samples that have a skewed class distribution) tends to perform well for generating predictions for data samples that belong to a majority class, but tends to perform poorly for generating predictions for data samples that belong to a minority-class. Such a neural network may be referred to as biased.

A typical existing approach for correcting the biased neural network involves first identifying data samples representing a minority-class (e.g., by mining for minority-class data samples from an unlabeled data pool, such as unlabeled images available online, and/or an unlabeled data stream, such as real-life images collected by end users). In the example of an object detection task, a data sample representing a minority-class may be a 2D image that includes a minority-class object (and possibly other objects that may not belong to the minority-class). A data mining algorithm may be used to identify minority-class data samples. Identification of minority-class data samples from a dataset (or data stream) may be referred to as minority-class data mining. Next, the identified minority-class data samples are labeled by a human annotator. The labeled minority-class data samples are then added to the training dataset, to balance the class distribution of labeled data samples in the training dataset. The neural network is then retrained using the balanced training dataset. There are different existing algorithms for identifying minority-class data samples from a data source, such as an unlabeled data pool or data stream.

An example of existing algorithm is uncertainty sampling. Uncertainty sampling is based on identifying data samples (e.g., from an unlabeled data pool or data stream) where the trained neural network has low certainty about the generated predictions. Two common metrics used to measure uncertainty are referred to as MaxScore and entropy. When the MaxScore metric is used, the maximum softmax probability across all candidate classes (referred to as the MaxScore) is computed for a given unlabeled data sample. If the MaxScore for the given unlabeled data sample is below a threshold, that given unlabeled data sample is identified as a possible minority-class data sample. Entropy is measure of uncertainty or indecisiveness among the softmax probabilities. When entropy is used as the metric for identifying minority-class data samples, any unlabeled data sample having entropy above a threshold is identified as a possible minority-class data sample. The threshold used for comparing the MaxScore metric or entropy metric may be a precomputed threshold (e.g., computed using a validation dataset).

Uncertainty sampling algorithms have been found to perform poorly when the class distribution of unlabeled data samples in the dataset is skewed. Only a small fraction of unlabeled data samples that were identified as possible minority-class data samples are actually ground truth minority-class data samples. This results in wasted time and money, as well as wasting computing resources (e.g., wasted computing time, wasted memory resources to store possible minority-class data samples that actually are not minority-class data samples). The poor performance of uncertainty sampling algorithms may be attributed to two reasons. First, subduing of minority-class probabilities due to the class imbalance in the dataset, resulting in distortion of corresponding uncertainty metrics. This effect can be aggravated in deep neural networks, in which the final softmax layer is prone to overfitting. Second, uncertainty metrics (such as the MaxScore and entropy metrics) aggregate the entire probability distribution of class-probabilities into a single scalar value, which results in loss of information about the pattern and relationships of the spread of probabilities among different classes.

Another existing method to find minority-class data samples is referred to as guided learning. Instead of mining existing datasets for minority-class data samples, guided learning employs humans (e.g., using crowdsourcing) to generate (e.g., create from scratch, or search online) new minority-class data samples. The humans label the new minority-class data samples and the labeled minority-class data samples are added to the existing training dataset used to train a neural network. A drawback of guided learning is that it can be slow, and financially expensive. The diversity of data samples generated by humans can also be problematic because the generated data samples do not match the domain of existing data samples in the training dataset (e.g., human-generated data samples may not have the same quality (such as image lighting or background) as the training dataset). Further, some domains, such as medical diagnosis data samples (e.g., medical scan images), are not amenable to being searched by humans (e.g., due to privacy concerns).

Another method for mining minority-class data samples is referred to as a hybrid approach. In a hybrid approach, uncertainty sampling is augmented with some exploration technique to obtain data samples from less explored areas in feature space. Example techniques for this exploration include Gaussian exploration and distance-based neighborhood estimation techniques. An exploration score is assigned to each unlabeled data sample, which quantifies the degree of representativeness of the unlabeled data sample (with respect to existing labeled data) or likelihood of the unlabeled data sample as belonging to a particular class. Unlabeled data samples with lower exploration scores (meaning the data samples are less representative in existing data) are preferred over data samples with higher exploration scores. Hybrid approach randomly switch between uncertainty sampling and exploration-based sampling to identify possible minority-class data samples.

A drawback of the hybrid approach is that it has been found to have poor performance in higher dimensional domains and when data samples lie on complex manifolds (e.g., not in a convex feature subspace). This limits the usefulness of the hybrid approach to complex data domains. The hybrid approach also requires computing exploration scores for each unlabeled data sample, which can be computationally expensive. Usually, a pass through all labeled data samples is required for each unlabeled data sample. As well, many identified possible minority-class data samples turn out to actually be majority-class data samples, especially in complex data domains. The result is wasted time, financial cost and computing resources.

In various examples, the present disclosure describes methods and systems for computer-based mining of minority-class data samples from a data source (such as an unlabeled data pool or data stream). The examples described herein may address some of the above drawbacks of existing methods and systems. In particular, the disclosed methods and systems may address at least some ways in which uncertainty sampling fails to mine minority-class data samples (i.e., minority-class examples), such as the problems of subdued minority-class activations due to class-imbalance and loss of information due to the use of a single scalar hardcoded metric to estimate the likelihood of a data sample belonging to one of minority-classes.

The disclosed methods and systems make use of a recalibration neural network, may help to reinforce the subdued activations of minority-classes by recalibration of the activations. The disclosed methods and systems also make use of an anomaly detector to model the entire distribution of activations, which may help to capture patterns and relationships among individual class-activations. It should be understood that, although the present disclosure describes examples having a single-layer recalibration neural network and an autoencoder, the functions of the single-layer recalibration neural network may be performed using any suitable recalibration neural network and the functions of the autoencoder may be performed using any suitable anomaly detector (e.g., a one-class support vector machine (SVM), or any suitable generative model such as a generative adversarial network (GAN) or variational autoencoder (VAE), among others).

The present disclosure describes the use of a recalibration neural network (e.g., a single-layer recalibration neural network) that is trained to prevent overfitting and to recalibrate distorted activations in a client neural network. Generally, the recalibration neural network may be any suitable neural network that may match the portion of the client neural network to be recalibrated. In examples described below, penultimate layer activations from the client neural network are recalibrated by a single-layer recalibration neural network (where the single-layer recalibration neural network is trained to perform the same function as the last layer of the client neural network). In other examples, any inner layer activation (e.g., second-last layer or third-last layer activation) may be recalibrated by training a corresponding recalibration neural network. For example, if the second-layer layer activations of the client neural network are to be recalibrated, then the recalibration neural network should be designed and trained to perform the same function as the last two layers of the client neural network. It should be noted that the recalibration neural network does not necessarily have the same size and structure as the layer(s) of the client neural network being recalibrated (e.g., a two-layer recalibration neural network may be used to recalibrate the last three layers of the client neural network), as long as the recalibration neural network can be trained to perform the same function as the corresponding layer(s) of the client neural network and designed to address the issue of overfitting.

The present disclosure also describes the use of an anomaly detector (e.g., an autoencoder) to identify anomalous data samples as minority-class data samples. The present disclosure describes the use of an autoencoder, as a reconstruction-based unsupervised anomaly detector. However, without loss of generality, many possible of anomaly detectors can be used. For instance, other reconstruction-based anomaly detectors may include principal component analysis (PCA) or sparse-PCA anomaly detectors. Another type of anomaly detection is density estimation-based anomaly detection, examples of which include Gaussian mixture models, among many others. Generative modeling (e.g., using GAN or VAE) is another method for anomaly detection. Other examples include discriminative methods like one-class SVM. Accordingly, the present disclosure is not limited to the use of an autoencoder to generate a minority-class score for predicting a candidate minority-class data sample.

Generally, examples disclosed herein relate to a variety of neural networks. For ease of understanding, the following describes some concepts relevant to neural networks and some relevant terms that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, . . . n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output. The output of the activation function may be used as an input to a neuron of a following layer in the neural network. The activation function may be a sigmoid function, for example. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may be relatively straightforward. Briefly, the operation at each layer is indicated by the following linear relational expression: $\vec{y}=\alpha(W\vec{x}+\vec{b})$, where $\vec{x}$ is an input vector, $\vec{y}$ is an output vector, $\vec{b}$ is an offset vector, W is a weight (also referred to as a coefficient), and $\alpha(.)$ is an activation function. At each layer, the operation is performed on an input vector $\vec{x}$, to obtain an output vector $\vec{y}$. Processing of data through the layers of the DNN, to generate a prediction output, may be referred to as forward propagation.

Because there is a large quantity of layers in the DNN, there is also a large quantity of weights W and offset vectors $\vec{b}$. Definitions of these parameters in the DNN are as follows, where the weight W is used as an example. In this example, in a three-layer DNN (i.e. a DNN with three hidden layers), a linear weight from a fourth neuron at a second layer to a second neuron at a third layer is denoted as $W_{24}^3$. The superscript 3 indicates a layer (i.e., the third layer (or layer-3) in this example) of the weight W, and the subscript indicates the output is at layer-3 index 2 (i.e., the second neuron of the third layer) and the input is at layer-2 index 4 (i.e., the fourth neuron of the second layer). Generally, a weight from a k-th neuron at an (L−1)-th layer to a j-th neuron at an L-th layer may be denoted as $W_{jk}^L$. It should be noted that there is no W parameter at the input layer.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

A convolutional neural network (CNN) is a DNN with a convolutional structure. The CNN includes a feature extractor consisting of a convolutional layer and a sub-sampling layer. The feature extractor may be considered as a filter. A convolution process may be considered as performing convolution on a two-dimensional (2D) input image or a convolutional feature map using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually includes several feature maps, and each feature map may be formed by some neurons arranged in a rectangle. Neurons at a same feature map share weights. The shared weights may be collectively referred to as a convolutional kernel. Typically, a convolutional kernel is a 2D matrix of weights. It should be understood that the convolutional kernel may be unrelated to a manner and position of image information extraction. A hidden principle behind convolutional layers is that statistical information of a part of an image is the same as that of another part of the image. This means that image information learned from one part of the image may also be applicable for another part of the image. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

In the process of training a DNN, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the predicted value outputted by the DNN is sufficiently converged with the desired target value). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

Reference is made to FIG. 1, which shows an example system 10 in which an example of the present disclosure is implemented. The following description shall not be construed as a limitation to any examples of this disclosure. The system 10 includes a client computing system 20 (also referred to simply as client 20) and a minority-class mining service 100. In FIG. 1, solid arrows indicate dataflow during a training phase of the minority-class mining service 100, and dashed arrows indicate dataflow during an inference phase of the minority-class mining service 100.

The client 20 may be any computing system (or group of computing systems) that is capable of training a client neural network 22 to perform a prediction task that involves classification. For example, the client 20 may be a workstation, a desktop computing system, a server, a server cluster, a centralized datacenter, an institutional datacenter, a computing cluster, etc. In the context of the present disclosure, a prediction task that involves classification may be any prediction task that involves predicting a class label for a data sample (e.g., an image classification, an object detection, or an image segmentation, among other possibilities). The client neural network 22 may be any neural network architecture that includes a classifier. The client 20 owns or has access to a labeled training dataset 24 for training the client neural network 22 in a supervised manner (i.e., using a supervised learning algorithm).

The training dataset 22 may be stored in a memory (e.g., a random access memory (RAM), a read-only memory (ROM), etc.) or a mass storage device (e.g., a solid state drive, a hard disk drive, etc.) of the client 20. Although shown as part of the client 20, the training dataset 22 may be stored in a database (not shown) external to the client 20. The training dataset 22 includes labeled data samples that are each assigned one or more class labels (from among a plurality of possible class labels). The class labels are considered ground-truth labels for training the client neural network 22 using the training dataset 24. The training dataset 24 may include any data format that is suitable for training the client neural network 22. For example, the labeled data samples in the training dataset 24 may be labeled 2D images.

The minority-class mining service 100 may be embodied in any computing system (or group of computing system) capable of training and deploying neural networks. For example, the minority-class mining service 100 may be implemented as software that that is provided as a service by a server, a server cluster, a distributed computing system, a cloud computing platform, etc.

The minority-class mining service 100 implements a recalibration neural network 102 (e.g., implemented using a first neural network, comprising a single neural network layer), an anomaly detector 104 (e.g., an autoencoder implemented using a second neural network, comprising an encoder subnetwork and a decoder subnetwork), a threshold estimation algorithm 106, and a candidate prediction algorithm 110. As will be discussed further below, one or more processing devices of the minority-class mining service 100 may execute software instructions to execute the operations of the recalibration neural network 102, the anomaly detector 104, the threshold estimation algorithm 106 and the candidate prediction algorithm 110, among other operations. It should be understood that, although a single-layer recalibration neural network is discussed below, any suitable recalibration neural network (e.g., multi-layer recalibration neural network) may be trained (as discussed further below) to perform the operations of the recalibration neural network 102. Similarly, any suitable anomaly detector (e.g., a one-class SVM, or any suitable generative model such as a GAN or VAE, among others) may be trained (as discussed further below) and used to detect a minority-class data sample as an anomaly.

The minority-class mining service 100 performs operations to identify one or more candidate minority-class data samples from a data source (e.g., an unlabeled data pool or data stream), which are sent to a labeling service 30. As will be discussed further below, the minority-class mining service 100 performs operations in a training phase to train (i.e., learn the weights of) the recalibration neural network 102, to train the anomaly detector 104, and to output a predicted minority-class threshold 108 from the threshold estimation algorithm 106. The minority-class mining service 100 also performs operations in an inference phase (also referred to as deployment) to use the trained recalibration neural network 102, the trained anomaly detector 104, and the candidate prediction algorithm 110 to predict whether a given data sample is a candidate minority-class data sample. The given data sample may be a data sample from an unlabeled data pool (i.e. a data pool that includes unlabeled data samples), a data sample from a labeled dataset where the data samples have not been labeled for any minority-class (i.e., the data samples are labeled, but the minority-class(es) were not included in the possible labels), or a data sample from an unlabeled data stream (e.g., data samples that are collected in real-time during the inference phase), among other possibilities.

The labeling service 30 (which may employ human labelers and/or may use computer algorithms) generates class labels for the candidate minority-class data samples. The labeled data samples are sent back to the client 20, to be included in the training dataset 24. In some examples, only labeled minority-class data samples are added to the training dataset 24. Any candidate minority-class data sample that is actually not a minority-class data sample (i.e., not labeled with any minority-class label) may not be added to the training dataset.

The minority-class mining service 100 performs a one-class learning process, to enable the minority-class mining service 100 to predict a candidate minority-class data sample (based on the predicted likelihood that a given data sample belongs to a minority-class). As will be discussed further below, the anomaly detector 104 may be an autoencoder, which has been trained on majority present majority-class activations. The likelihood that a given data sample is a candidate minority-class data sample is then estimated based on the quality of reconstruction produced by the autoencoder. It is expected that a minority-class activation pattern cannot be reconstructed accurately by the autoencoder that is trained on labeled data samples that mostly represent a majority-class. In general, since the anomaly detector 104 is trained using a training dataset which includes labeled data samples with a skewed class distribution, the anomaly detector 104 learns the latent representation of the activation patterns of majority-class data samples. During inference, the activation pattern of a minority-class data sample acts as an anomaly and is detectable as a candidate minority-class data sample. Accordingly, the minority-class mining service 100 enables mining of candidate minority-class data samples from a data source (e.g., an unlabeled data pool or data stream) that lacks data samples having a minority-class label.

Communications between the client 20, minority-class mining service 100, and labeling service 30 may be via wired communication links (e.g., Ethernet connection) and/or wireless communication links (e.g., via a wireless network (not shown), such as the Internet). Although not shown in FIG. 1, communications between the client 20, minority-class mining service 100, and labeling service 30 may be managed by respective software agents (hereinafter "agents") in each of the client 20, minority-class mining service 100, and labeling service 30. Agents in each of the client 20, minority-class mining service 100, and labeling service 30 may be responsible for providing a communications interface, and managing data communications (e.g., communication of inner-layer activations and labels from the client 20 to the minority-class mining service 100).

Although a single instance of the client 20 is shown, it should be understood that a plurality of clients 20, each having a respective client neural network 22 (and optionally each having a respective training dataset 24), may communicate with and use the services provided by the minority-class mining service 100. Further, a single client 20 may have a plurality of client neural networks 22 that perform a respective plurality of prediction tasks that involve classification. The minority-class mining service 100 may maintain multiple instances of the recalibration neural network 102 and the anomaly detector 104, to service respective multiple client neural networks 22 (each instance of the recalibration neural network 102 and anomaly detector 104 being tailored to a respective client neural network 22). The threshold estimation algorithm 106 may be the same regardless of the client neural network 22 serviced, or may also be tailored to each respective client neural network 22.

It should be noted that FIG. 1 is merely a schematic diagram of an example system 10 according to an example of the present disclosure. Relationships and interactions that are shown in FIG. 1 are not intended to be limiting to the present disclosure.

Figure 2:
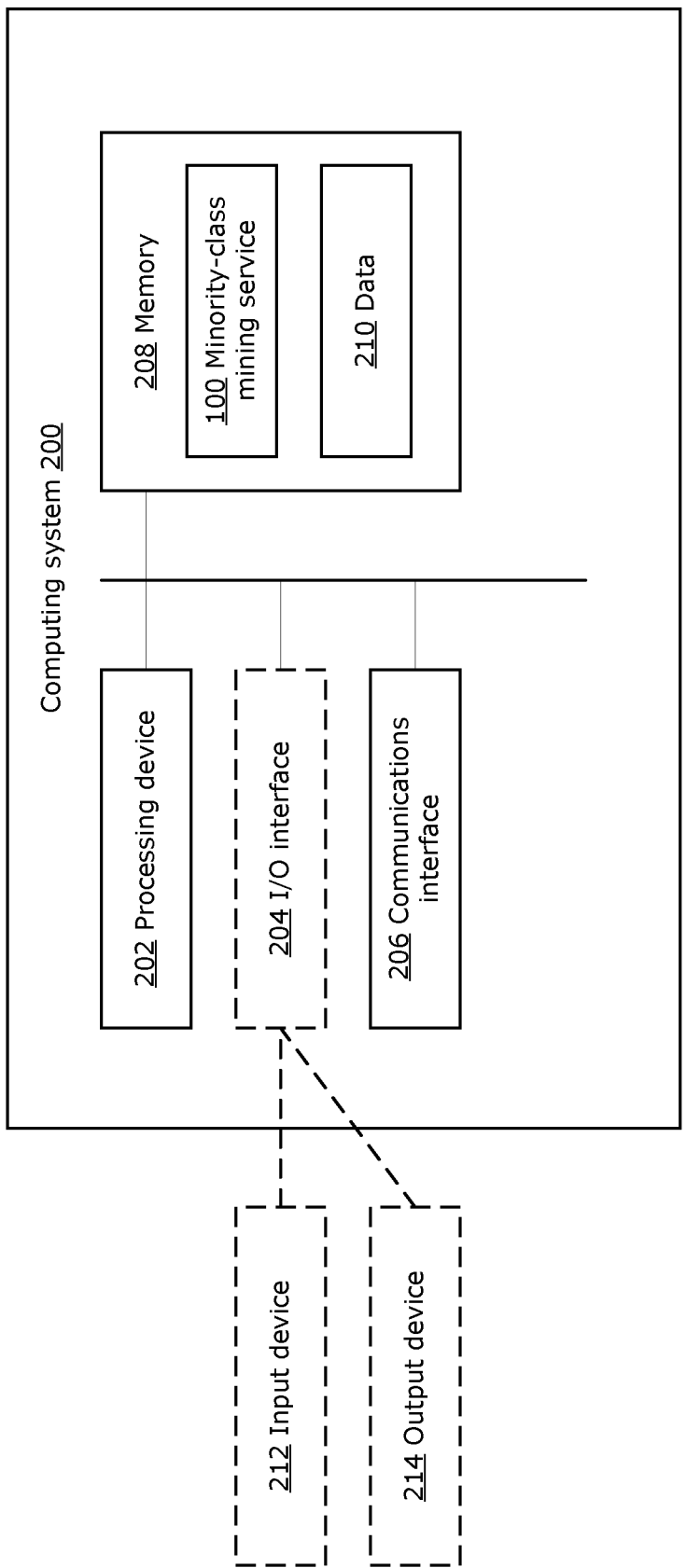
FIG. 2 is a block diagram illustrating an example computing system suitable for implementing examples of the present disclosure.

FIG. 2 illustrates an example implementation of the minority-class mining service 100 in a single computing system 200 (e.g., a single server), however this is not intended to be limiting. Although an example computing system 200 is shown and discussed below, other embodiments may be used to implement examples disclosed herein, which may include components different from those shown. Although FIG. 2 shows a single instance of each component, there may be multiple instances of each component shown.

The computing system 200 includes one or more processing devices 202, such as a processor, a microprocessor, an application-specific integrated circuit (ASIC), a field-programmable gate array (FPGA), a dedicated logic circuitry, a dedicated artificial intelligence processor unit, or combinations thereof. The computing system 200 also includes one or more optional input/output (I/O) interfaces 204, which interfaces with one or more optional input devices 212 (e.g., a keyboard, microphone, mouse, touchscreen, etc.) and one or more optional output devices 214 (e.g., a display, speaker, etc.). The optional input device(s) 212 and optional output device(s) 214 may each be external to the computing system 200, as illustrated in FIG. 2. In other examples, the optional input device(s) 212 and/or optional output device(s) 214 may be integrated with the computing system 200.

The computing system 200 includes one or more communications interfaces 206 for wired or wireless communication with an external system or network (e.g., an intranet, the Internet, a P2P network, a WAN and/or a LAN). The communications interface(s) 206 may enable communication using wired links (e.g., Ethernet, etc., using one or more cables) and/or wireless links (e.g., Wi-Fi, Bluetooth, etc., using one or more antennas) for intra-network and/or inter-network communications. The communications interface(s) 206 may enable the computing system 200 to communicate with an external system, such as one or more clients 20, the labeling service 30 and/or one or more databases storing training datasets.

The computing system 200 includes one or more memories 208, which may include a volatile or non-volatile memory (e.g., a flash memory, a random access memory (RAM), and/or a read-only memory (ROM)). The non-transitory memory(ies) 208 may store executable instructions for execution by the processing device(s) 202, such as to carry out examples described in the present disclosure. For example, the memory(ies) 208 may include instructions for executing the operations of the minority-class mining service 100. The memory(ies) 208 may include other instructions, such as instructions for implementing an operating system and other applications/functions. The memory(ies) 208 may also include data 210, such as activation values, labels and threshold values received from the client 20.

In some examples, the computing system 200 may also include one or more electronic storage units (not shown), such as a solid state drive, a hard disk drive, a magnetic disk drive and/or an optical disk drive. In some examples, one or more data sets and/or modules may be provided by an external memory (e.g., an external drive or cloud storage in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Reference is made again to FIG. 1. Some notation is introduced to assist in understanding the present disclosure. The client neural network 22 has been trained (e.g., using any suitable training process) using a supervised learning algorithm, the training dataset 24, and a loss function. In particular, the client neural network 22 may have been trained, in a supervised manner, to perform a prediction task that involves classification. The trained client neural network 22 may be referred to as a learned neural model and denoted as learned model M in FIG. 1. The training dataset 24 may be denoted as a finite labeled dataset $D_L$, containing labeled data samples $X_L$ and labels $Y_L$. Each data sample (denoted as $x_L$, $x_L \subset X_L$) is labeled with one or more labels (denoted as $y_L$, $y_L \in Y_L$) (thus, the training dataset 24 includes ($x_L$, $y_L$) pairs, where $x_L$ is a data sample and $y_L$ is one or more labels assigned to the data sample). The labels $Y_L$ indicate a plurality of possible classes denoted as C. The training dataset 24 may have a class imbalance, such that there is a set of one or more minority classes denoted as $C_M$ ($C_M \subset C$) that is underrepresented in the data samples $X_L$. The client 20 is capable of extracting inner-layer activations, denoted as $A_L$, from the client neural network 22. For example, the inner-layer activations $A_L$ may be penultimate layer activations that are the output values of the penultimate layer (e.g., softmax layer) of the neural network 22, prior to the final output layer.

As previously mentioned, operation of the minority-class mining service 100 includes a training phase and an inference phase. Details of the training phase are first discussed. An example of the dataflow in the training phase is illustrated by solid arrows in FIG. 1.

The training phase begins with the client 20 communicating inner-layer activations $A_L$ and corresponding labels $Y_L$ to the minority-class mining service 100. Each activation represents the activation values computed by the client neural network 22 for a given labeled data sample $x_L$ from the training dataset 24, and each activation is associated with the label $y_L$ that has been assigned to the given labeled data sample $x_L$ by the client neural network 22. It should be noted that the client neural network 22 has already been trained using the training dataset 24, and training of the client neural network 22 does not take place during the training phase of the minority-class mining service 100. The minority-class mining service 100 trains the recalibration neural network 102, using the inner-layer activations $A_L$ and labels $Y_L$, which is designed to obtain recalibrated activations and hence avoid subdued/distorted activations because of overfitting of the final-softmax layer of the client neural network 22. The minority-class mining service 100 then trains the anomaly detector 104 using the output of the trained recalibration neural network 102, to enable the anomaly detector to learn the latent space of the probability distribution of the recalibrated activations (e.g., a mapping of the probabilistic features of the recalibrated activations). Validation data is used by the threshold estimation algorithm 106 to predict the minority-class threshold 108, which is provided to the client 20.

The recalibration neural network 102 helps to address the problem (in uncertainty sampling) of distortion of activations due to overfitting. As will be discussed further below, the recalibration neural network 102 is trained in a manner to prevent overfitting. The anomaly detector 104 helps to address the problem (in uncertainty sampling) of the loss of information due the use of a scalar and hard-coded metric used in uncertainty sampling. The anomaly detector 104 is trained to learn a model of the entire distribution of activations, to help capture identifying patterns among individual class-activations. The anomaly detector 104 is trained on dataset having skewed data distribution, such that the anomaly detector 104 learns a latent representation of the activation pattern of majority-class data samples. When the trained anomaly detector 104 is used during an inference phase, the activation pattern of a minority-class data sample is detected as an anomaly and thus can be identified as a candidate minority-class data sample.

Notably, the minority-class mining service 100 does not need to own or receive the client neural network 22, does not need to know or have access to the training process used by the client 20 to train the client neural network 22, and does not need to access or receive the labeled data samples in the set $X_L$ contained in the training dataset 24. Although the minority-class mining service 100 receives the inner-layer activations $A_L$ and labels $Y_L$ from the client 20, such information may not reveal the details (e.g., specific neural network architecture, specific data samples in the set $X_L$) of the client neural network 22 and the training dataset 24. In this way, the data privacy of the client 20 may be preserved.

Figure 3:
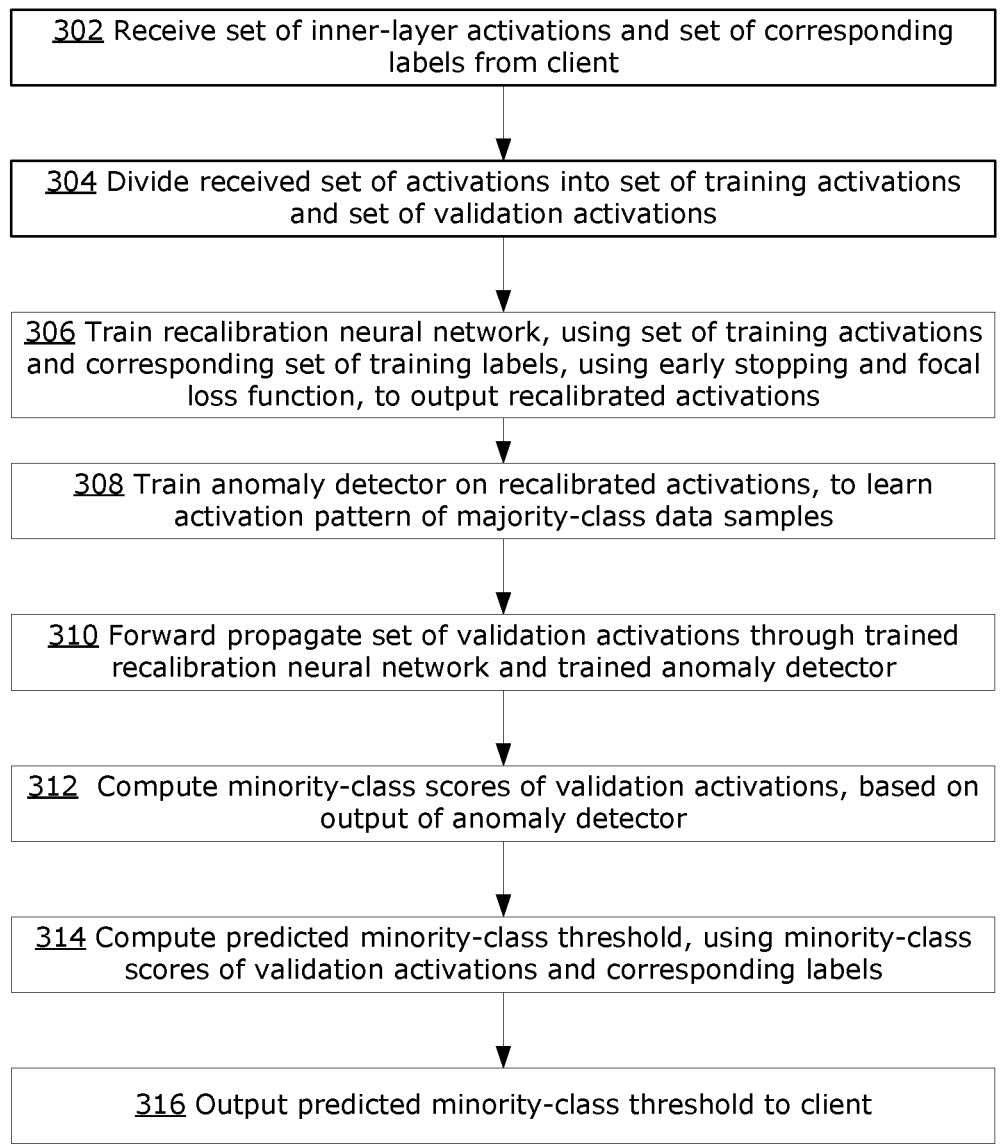
FIG. 3 is a flowchart of an example method for a training phase of a minority-class mining service, in accordance with examples of the present disclosure.

FIG. 3 is a flowchart illustrating an example method 300 for training the minority-class mining service 100, and to output a predicted optimal minority-class threshold. The predicted minority-class threshold may be used in an inference phase to control precision and/or recall for identifying candidate minority-class data samples from data that lacks minority-class labels. The method 300 may be performed by the minority-class mining service 100, for example, when running on the computing system 200 of FIG. 2.

At 302, inner-layer activations $A_L$ (e.g., penultimate layer activations) and the corresponding labels $Y_L$ are received from the client 20 (e.g., via respective agents of the minority-class mining service 100 and the client 20). For example, the inner-layer activations $A_L$ are the activation values outputted by the penultimate layer of the client neural network 22, from respective labeled data samples $X_L$ in the training dataset 24. The corresponding labels $Y_L$ are the ground-truth class labels assigned to the respective data samples $X_L$ in the training dataset 24. Each activation in the inner-layer activations $A_L$ has at least one corresponding label in the corresponding labels $Y_L$. The client 20 may also communicate an identification of the minority-class(es) to the minority-class mining service 100. Alternatively, the minority-class mining service 100 may identify the minority-class(es) based on the class distribution of the corresponding labels $Y_L$ (e.g., any class represented by fewer than 10% of the set of corresponding labels $Y_L$ may be identified as a minority-class, or the class that is least represented in the corresponding labels $Y_L$ may be identified as a minority-class).

At 304, the received set of activations $A_L$ is divided into a set of training activations (denoted as $A_{TL}$) and a set of validation activations (denoted as $A_{VL}$). The division into the set of training activations $A_{TL}$ and the set of validation activations $A_{VL}$ may be performed using stratified random sampling across all available classes (i.e., the activations for each given class (as identified using the respective corresponding labels) are randomly and evenly divided into training activations and validation activations). This may ensure that the set of training activations $A_{TL}$ and the set of validation activations $A_{VL}$ are each representative of the class distribution of the data samples $X_L$. It should also be noted that the corresponding labels $Y_L$ is also implicitly divided into a set of training labels (denoted as $Y_{TL}$) and a set of validation labels (denoted as $Y_{VL}$) by this step.

At 306, the recalibration neural network 102 is trained, using the set of training activations $A_{TL}$, corresponding set of training labels YTS, and a focal loss function. In the example where the received activations from the client neural network 22 are penultimate-layer activations, the recalibration neural network 102 may be a single-layer neural network (e.g., a single fully-connected layer). Training of the recalibration neural network 102 may be performed as follows.

The recalibration neural network 102 includes a hyperparameter specifying a dimension of the inputs to recalibration neural network 102. The hyperparameter is initialized with a value corresponding to the dimension of each activation in the set of training activations $A_{TL}$. The dimension of the outputs of recalibration neural network 102 is equal to the number of possible classes. That is, the recalibration neural network 102 is intended to replicate the prediction task that involves classification performed by the layer(s) of the client neural network 22 following the inner-layer that generated the received inner-layer activation. Weights of the recalibration neural network 102 may be each initialized to a random value. Activations in the set of training activations $A_{TL}$ may be sampled in batches or sampled individually. Sampled training activations are forward propagated through the recalibration neural network 102 to output a predicted label for each sampled training activation. Using the predicted label, the corresponding ground-truth training label, and a focal loss function, a focal loss for the recalibration neural network 102 is computed. The focal loss function is a dynamically weighted cross entropy loss function, which can be expressed as follows:

$$FL = -(1-p_t)^\gamma \log(p_t)$$

where FL is the focal loss, $p_t$ is the probability corresponding to the correct class (the correct class being indicated by the corresponding ground-truth training label) and γ is a selectable parameter controlling the amount of influence of the weighting term. Optimization of the focal loss function involves maximizing the activation corresponding to the correct class, similar to the cross entropy loss function. However, the focal loss function down-weights the contribution of more common classes (i.e., majority-classes) and focuses learning on less common classes (i.e., minority-classes) as learning progresses.

The computed focal loss is back propagated (e.g., using gradient descent) to update the weights of the recalibration neural network 102. The recalibration neural network 102 is trained over a plurality of epochs (a single epoch being a single pass through all activations in the set of training activations $A_{TL}$). Output of the trained recalibration neural network 102 is a set of recalibrated activations, denoted as $L_{TL}$.

The recalibration neural network 102 is trained in a manner to avoid overfitting (which tends to cause distortion of class probabilities and hence poor prediction for minority-classes). The focal loss function may be less prone to overfitting, compared to other loss functions (e.g., cross-entropy loss function) typically used to train a classifier neural network. Further, the recalibration neural network 102 may be trained with early stopping. That is, the training may be performed over a fewer number of epochs (e.g., 20 epochs or fewer), compared to the typical training for a classifier neural network (e.g., 100 epochs or more). Although some example methods to avoid overtraining of the recalibration neural network 102 have been described, it should be understood that other methods that reduce or avoid overtraining may be used in addition to or in place of focal loss and early stopping. For example, methods such as regularization or weight decay may be used to reduce or avoid overfitting. These and other such training methods to avoid overtraining would be understood by a person skilled in the art to be within the scope of the present disclosure.

At 308, the anomaly detector 104 is trained to learn the probability distribution (or internalize the identifying patterns) of the set of recalibrated activations $L_{TL}$. For example, the anomaly detector 104 may be an autoencoder that is trained using a reconstruction loss function. Training of the autoencoder may be performed in an unsupervised manner as follows.

The autoencoder is initialized to receive the set of recalibrated activations $L_{TL}$ from the recalibration neural network 102. Specifically, the set of recalibrated activations $L_{TL}$ that the autoencoder receives from the recalibration neural network 102 is the set of recalibrated activations $L_{TL}$ generated from the last epoch of the training for the recalibration neural network 102. The recalibrated activations $L_{TL}$ may be received from the recalibration neural network 102 before a softmax function is applied (the activation values before the softmax function is applied may be referred to as logits). Receiving the recalibrated activations $L_{TL}$ as logits may help to ensure stable and easy training of the autoencoder (as opposed to training on sparse softmax values). However, in other examples recalibrated activations $L_{TL}$ may be received by the autoencoder as softmax values. Weights of the autoencoder may be each initialized to a random value. The activations in the set of recalibrated activations $L_{TL}$ may be sampled in batches or sampled individually. Sampled recalibrated activations are forward propagated through the autoencoder to output a reconstructed activation for each sampled recalibrated activation. Using the reconstructed activation, the corresponding original recalibrated activation, and a reconstruction loss function, a reconstruction loss for the autoencoder is computed. The reconstruction loss function may be a mean square error (MSE) loss function as follows:

$$L = \sqrt{\Sigma(X-Y)^2}$$

where L is the computed reconstruction loss, Y is the ground-truth original recalibrated activation, and X is the reconstructed activation.

The reconstruction loss is back propagated (e.g., using gradient descent) to update the weights of the autoencoder. Training of the autoencoder may continue until all activations in the set of recalibrated activations $L_{TL}$ have been sampled. It should be understood that other loss calculation may be used to train the autoencoder. Further, it should be understood that a different training method may be used for different types of anomaly detector 104 (e.g., PCA, GAN, VAE, etc.), and would be understood by a person skilled in the art to be within the scope of the present disclosure.

Training of the anomaly detector 104 enables the anomaly detector 104 to learn a latent model of the probability distribution of the recalibrated activations for majority-class data samples. In particular, in the case where the anomaly detector 104 is an autoencoder, the autoencoder is trained such that, during an inference phase, recalibrated activations for majority-class data samples are reconstructed well but recalibrated activations for minority-class data samples are reconstructed poorly. The quality of the reconstruction can be evaluated numerically to generate a minority-class score, as discussed in the following step.

At 310, the set of validation activations $A_{VL}$ is forward propagated through the trained recalibration neural network 102 and trained anomaly detector 104, to predict a minority-class score of each of the recalibrated validation activations (denoted as $L_{VL}$). As previously mentioned, input to the anomaly detector 104 may be the recalibrated activation values from the recalibration neural network 102 before the softmax function is applied (also referred to as logits).

At 312, a minority-class score is computed for all the validation activations, based on the output of the anomaly detector 104. For example, if the anomaly detector 104 is an autoencoder, the quality of the reconstruction generated by the autoencoder is numerically evaluated (similar to the method 400 performed during an inference phase as explained further below) to compute a minority-class score for all reconstructed activations generated from the set of validation activations $A_{VL}$. Thereafter, the most optimal value of the minority-class threshold is estimated by executing the threshold estimation algorithm 106. An example method for numerically evaluating the quality of reconstruction is as follows.

For example, the softmax function may be optionally applied to both the given original validation activation and the reconstructed activation generated therefrom by the autoencoder (applying softmax may help to amplify the quality difference). The MSE loss between the original validation activation (with softmax optionally applied) and the reconstructed activation (with softmax optionally applied) is computed. If the MSE loss is high, this indicates the reconstruction was poor and hence the original validation activation is likely generated from a minority-class data sample. Accordingly, the MSE loss may be used as the minority-class score, where the higher the minority-class score the greater the likelihood that the corresponding data sample (represented by the activation) is a minority-class data sample. It should be understood that other methods may be used to numerically evaluate the quality of the reconstruction and thus compute the minority-class score. Further, it should be understood that different types of anomaly detector 104 (e.g., PCA, GAN, VAE, etc.) may generate different anomaly detector output that may be numerically evaluated in different ways to detect an anomaly (and hence a candidate minority-class data sample). It would be understood by a person skilled in the art that techniques to use the output of different types of anomaly detectors to detect an anomaly are within the scope of the present disclosure.

At 314, a predicted minority-class threshold is computed (e.g., by executing the threshold estimation algorithm 106), using the minority-class scores of the validation activations and the set of validation labels $Y_{VL}$. An example of the threshold estimation algorithm 106 is as follows.

The threshold estimation algorithm 106 pairs the minority-class score computed for a given validation activation with the ground-truth validation label corresponding to the given validation activation. The threshold estimation algorithm 106 sorts all minority-class scores (each of which is paired with a validation label) in ascending or descending order. Because the minority-class score represents the likelihood that the validation activation is generated from a minority-class data sample, it is expected that a validation label representing a minority-class should be paired with a higher minority-class score, whereas a validation label representing a majority-class should be paired with a lower minority-class score. Based on the sorted minority-class scores, the threshold estimation algorithm 106 computes a numerical threshold value representing a boundary between the minority-class scores paired with minority-class labels and the minority-class scores paired with majority-class labels. The threshold estimation algorithm 106 may use any suitable method for computing the numerical threshold value. For example, the threshold estimation algorithm 106 may use any method that maximizes both the precision and recall of predicting minority-class data samples, when the predicted minority-class threshold is used by a threshold-based classifier. For example, the threshold estimation algorithm 106 may compute the numerical threshold value based on the precision recall curve, or by maximizing a metric such as the F-score. Any other method may be used by the threshold estimation algorithm 106 to compute the numerical threshold value, include simple statistical methods (e.g., computing the numerical threshold value above which 95% of minority-class data samples are found).

The numerical threshold value computed by the threshold estimation algorithm 106 is the optimal predicted value of the minority-class threshold that is predicted by the minority-class mining service 100.

At 316, the predicted minority-class threshold is outputted by the minority-class mining service 100 to the client 20 (e.g., via respective agents of the minority-class mining service 100 and the client 20).

The client 20 may store the predicted minority-class threshold (e.g., in a local memory of the client 20) as the minority-class threshold 108. The minority-class threshold 108 may be adjusted by the client 20. For example, if the client 20 wishes to reduce false positives (i.e., majority-class data samples that are falsely identified as candidate minority-class data samples), the minority-class threshold 108 may be adjusted to have a higher threshold value. Conversely, if the client 20 wishes to identify more candidate minority-class data samples (at the possible risk of more false positives), the minority-class threshold 108 may be adjusted to have a lower threshold value.

In some examples, step 316 may be omitted and the predicted minority-class threshold may not be outputted to the client 20. For example, the minority-class mining service 100 may itself store the minority-class threshold 108. In such examples, the client 20 may communicate with the minority-class mining service 100 to adjust the minority-class threshold 108. Alternatively, the minority-class threshold 108 may not be adjustable by the client 20.

After the minority-class threshold 108 has been predicted and optionally received by the client 20 from the minority-class mining service 100, the training phase of the minority-class mining service 100 may end. Subsequently (at any future time following the end of the training phase), the minority-class mining service 100 may perform operations of the inference phase to identify candidate minority-class data samples from data that does not include any minority-class labels.

Reference is made again to FIG. 1. An example of the dataflow in the inference phase is illustrated by dashed arrows in FIG. 1.

In the inference phase, the client 20 has access to a source of data that lacks minority-class labels. This data is the data to be mined for candidate minority-class data samples. Data that lacks minority-class labels may be data without any labels (i.e., unlabeled data), or may be data that has been labeled but the minority-class(es) were not included in the possible classes for labeling. In some examples, the data to be mined may have some minority-class labels, but the client 20 may wish to use the minority-class mining service 100 to identify additional data samples that should have minority-class labels (e.g., if the client 20 believes that the data was mislabeled). That is, even if the data includes some minority-class labels, the data may nonetheless be lacking in minority-class labels because there should be a greater number of minority-class labels assigned. The source of the data may be an existing dataset, an unlabeled data pool (e.g., an online data repository) or may be a data stream (e.g., inference data obtained in real-time), for example.

If the minority-class threshold 108 is stored by the client 20, the client 20 communicates the minority-class threshold 108 (which the client 20 may have adjusted after receiving from the minority-class mining service 100). The minority-class mining service 100 uses the minority-class threshold 108 received from the client 20 (which may be different from the predicted minority-class threshold originally generated by the minority-class mining service 100) for identifying candidate minority-class data samples, as discussed further below. Alternatively, if the minority-class threshold 108 is stored by the minority-class mining service 100, the minority-class mining service 100 may retrieve the minority-class threshold 108 from a memory.

The client 20 communicates the inner-layer activation, from the client neural network 22, of a given data sample to the minority-class mining service 100. The inner-layer activation that is communicated from the client 20 for inference should correspond to the inner-layer activations that were used for training the minority-class mining service 100 (i.e., if penultimate layer activations were used for training the minority-class mining service 100, then penultimate layer activations should be communicated by the client 20 for inference). The minority-class mining service 100 uses the trained recalibration neural network 102 to generate a recalibrated activation from the received activation. The trained anomaly detector 104 is then used detect a possible anomaly, and the output of the anomaly detector 104 is used to compute a minority-class score. For example, if the anomaly detector 104 is a trained autoencoder, the trained autoencoder is used to reconstruct the recalibrated activation and the quality of reconstruction is evaluated by the candidate prediction algorithm 110 to compute the minority-class score for the received activation. The candidate prediction algorithm 110 compares the computed minority-class score with the minority-class threshold 108 received from the client 20 to determine whether the received activation represents a candidate minority-class data sample. If the received activation is identified as representing a candidate minority-class data sample (e.g., the computed minority-class score is above the minority-class threshold 108), the minority-class mining service 100 sends the candidate minority-class data sample to the labeling service 30 for labeling.

The labeling service 30 generates one or more class labels for the candidate minority-class data sample (e.g., using a human labeler). A labeled data sample generated using the one or more class labels may (e.g., if the labeled data sample is in fact a minority-class data sample) be added to the training dataset 24. In this way, the class imbalance of the training dataset 24 may be corrected, by adding more minority-class data samples to the training dataset 24. The client neural network 22 may be retrained using the rebalanced training dataset 24 (e.g., after a minimum number of minority-class data samples have been mined and added to the training dataset 24). In some examples, prior to retraining the client neural network 22, the class distribution of the labels in the training dataset 24 may be analyzed to ensure that there is a sufficiently balanced class distribution.

In some examples, mining for minority-class data samples and retraining of the client neural network 22 may be repeated. For example, the client neural network 22 may be trained on the rebalanced training dataset 24 after a certain amount of mining has been performed (e.g., after a given source of data has been mined for candidate minority-class data samples). However, the rebalanced training dataset 24 and retrained client neural network 22 may suffer from a lack of data samples for a new minority-class (e.g., the training dataset 24 may have been rebalanced for a first minority-class that was previously the most underrepresented, but after rebalancing a second minority-class is now the most underrepresented). Subsequently, the minority-class mining service 100 may repeat the training phase using activations generated by the retrained client neural network 22, and may repeat the inference phase to mine for candidate minority-class data samples (for a different minority-class than the previous mining). The training dataset 24 may thus be further augmented and the client neural network 22 may be further retrained.

Notably, the minority-class mining service 100 does not need to own or receive the client neural network 22, does not need to know or have access to the training process used by the client 20 to train the client neural network 22, and does not need to directly access the source of the data to be mined. In some examples, to ensure greater data privacy, the client 20 may use a code or other identifier to identify each activation communicated to the minority-class mining service 100. Only the client 20 knows the data sample corresponding to each identifier. When the minority-class mining service 100 determines that a given received activation represents a candidate minority-class data sample, the minority-class mining service 100 may communicate the identifier of the given activation to the client 20 or to the labeling service 30. If the identifier is communicated to the labeling service 30, the labeling service 30 may in turn communicate the identifier to the client 20. The client 20 may then use the identifier to identify the corresponding data sample as the candidate minority-class data sample, and the client 20 may send the identified candidate minority-class data sample to the labeling service 30. The labeling service 30 then sends the labeled minority-class data sample back to the client 20. The minority-class mining service 100 thus may be completely blind as to the actual data sample.

Figure 4:
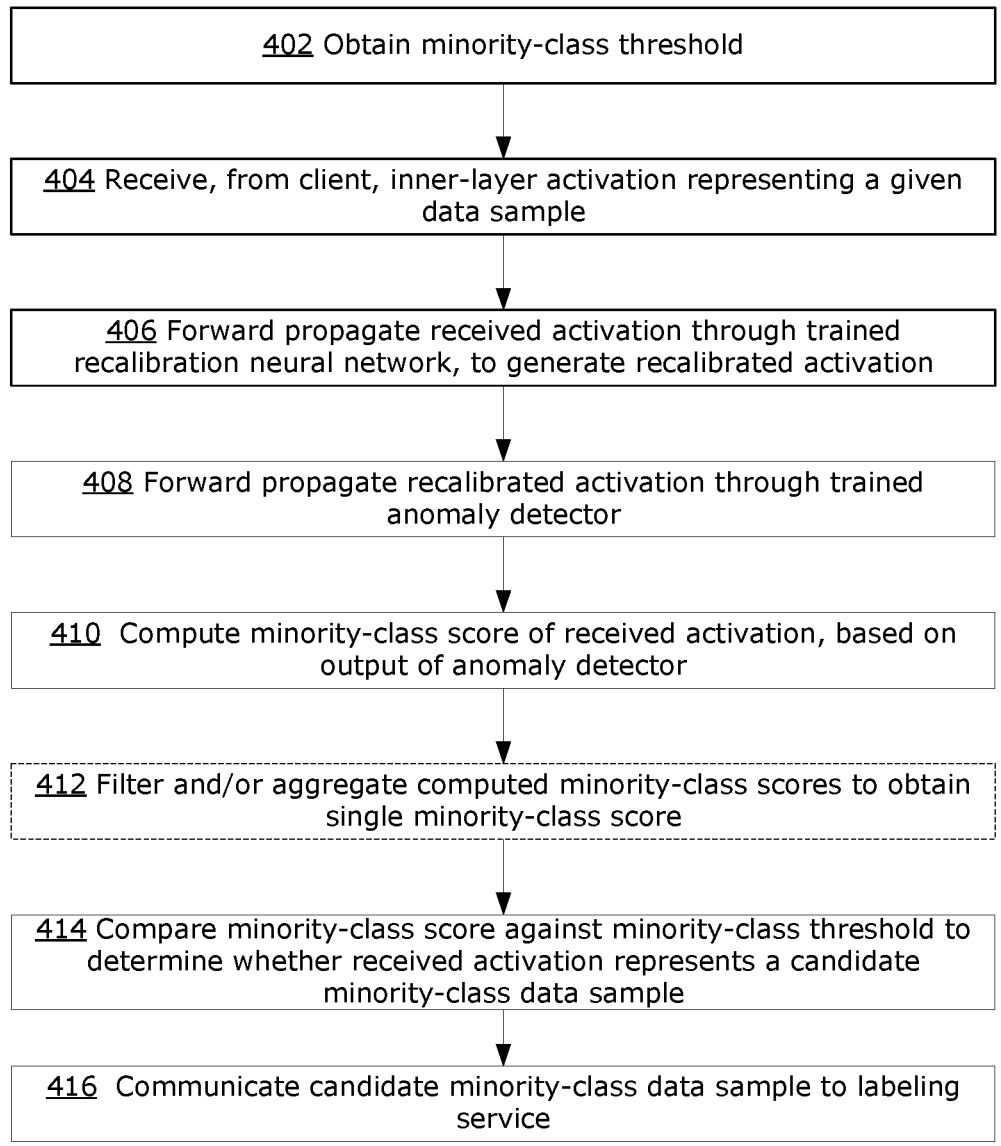
FIG. 4 is a flowchart of an example method for an inference phase of a minority-class mining service, in accordance with examples of the present disclosure.

FIG. 4 is a flowchart illustrating an example method 400, which may be performed by the minority-class mining service 100, to identify a candidate minority-class data sample. The method 400 may be performed by the minority-class mining service 100 during the inference phase, following the training phase discussed above. The method 400 may be performed by the minority-class mining service 100, for example, when running on the computing system 200 of FIG. 2.

At 402, a minority-class threshold 108 is obtained. For example, the minority-class threshold 108 may be received from the client 20. The minority-class threshold 108 may be communicated to the minority-class mining service 100 when the client 20 initiates a request for the services of the minority-class mining service 100. In some examples, the minority-class threshold 108 may be stored by the minority-class mining service 100 instead of the client 20. In such examples, the minority-class threshold 108 may instead be obtained from a memory of the minority-class mining service 100.

At 404, the inner-layer activation representing a given data sample is received from the client 20. The received activation may be denoted as $A_U$. The received activation $A_U$ may be extracted by the client 20 from an inner-layer of the client neural network 22 (corresponding to the inner-layer from which activations were extracted during the training phase) when the given data sample is forward propagated through the client neural network 22. Although referred to in the singular, it should be understood that the received activation $A_U$ may be a set of activation values, corresponding to the activation pattern of the inner-layer of the client neural network 22.

The received activation may be received from the client 20 as a batch of activations, or as a real-time stream of activations. Regardless of how the received activation is received, the minority-class mining service 100 may process each received activation individually.

At 406, the received activation $A_U$ is forward propagated through the trained recalibration neural network 102, to generate a recalibrated activation. The recalibrated activation (denoted as $L_U$) is provided to the trained anomaly detector 104. In some examples, the values of the recalibrated activation prior to the softmax function (i.e., the logits) may be provided as the recalibrated activation to the trained anomaly detector 104.

At 408, the recalibrated activation (which may be represented by logits) is forward propagated through the trained anomaly detector 104 to generate an anomaly detector output. For example, if the anomaly detector 104 is a trained autoencoder, the anomaly detector output may be a reconstructed activation.

At 410, a minority-class score is computed for the received activation, based on the anomaly detector output. Computation of the minority-class score may be performed by the candidate prediction algorithm 110, using the same computations as the threshold estimation algorithm 106 described above.

For example, if the anomaly detector 104 is an autoencoder, the softmax function may be applied to both the original received activation and the reconstructed activation generated therefrom by the autoencoder. The MSE loss between the original received activation (with softmax optionally applied) and the reconstructed activation (with softmax optionally applied) is computed. The MSE loss is then used as the minority-class score for the received activation. Further, it should be understood that minority-class score computation may be different for different types of anomaly detector 104 (e.g., PCA, GAN, VAE, etc.). For example, different anomaly detectors may generate different types of anomaly detector outputs that may be numerically evaluated in different ways to detect an anomaly (and hence a candidate minority-class data sample). It would be understood by a person skilled in the art that techniques to use the output of different types of anomaly detectors to detect an anomaly are within the scope of the present disclosure.

In some examples, optional step 412 may be performed. Optional step 412 may be performed in the case where there are multiple received activations representing a single given data sample. For example, if the client neural network 22 is trained to perform an object detection task, there may be multiple objects detected in the given data sample (e.g., 2D image) and hence multiple activations (one activation corresponding to each object detection). In such a case, steps 406 to 410 may be repeated for each received activation, to obtain multiple minority-class scores. Optional step 412 may be performed to reduce the multiple minority-class scores into a single minority-class score, which will be compared against the minority-class threshold 108.

At optional step 412, which may be performed by executing the candidate prediction algorithm 110, multiple computed minority-class scores (which have been computed for respective multiple received activations) are filtered and/or aggregated. For example, the multiple computed minority-class scores may be filtered to keep only the top K most confident detections (where K is a selectable hyperparameter). Alternatively or additionally, the minority-class scores may be aggregated using any suitable aggregation method (e.g., simple averaging) to obtain a single minority-class score.

At 414, which may be performed by executing the candidate prediction algorithm 110, the minority-class score is compared against the minority-class threshold 108 to determine whether the received activation represents a candidate minority-class data sample. For example, if the minority-class score is above the minority-class threshold 108, the corresponding received activation may be flagged as representing a candidate minority-class data sample.

At 416, the candidate minority-class data sample (represented by the received activation) is communicated by the minority-class mining service 100 to the labeling service 30. Alternatively, the minority-class mining service 100 may instead communicate an identifier associated with the received activation to the client 20 to enable the client 20 to identify the candidate minority-class data sample and communicate the candidate minority-class data sample to the labeling service 30. Alternatively, the minority-class mining service 100 may instead communicate an identifier associated with the received activation to the labeling service 30 to enable the labeling service 30 to query the candidate minority-class data sample from the client 20.

The minority-class mining service 100 does not need to participate in subsequent operations at the labeling service 30 and the client 20 to generate a label for the candidate minority-class data sample and to rebalance the training dataset 24 with the labeled minority-class data sample.

The method 400 may be repeated over a plurality of data samples sourced by the client 20, to rebalance the training dataset 24 with added labeled minority-class data samples.

It should be noted that the minority-class mining service 100 tailors the recalibration neural network 102 and the anomaly detector 104 for each client neural network 22. In the case where there are multiple clients 20, or a single client 20 has multiple client neural networks 22, the minority-class mining service 100 performs the operations of the training phase to train the recalibration neural network 102 and the anomaly detector 104, and to predict a minority-class threshold for each client neural network 22. The minority-class mining service 100 then maintains (e.g., in memory) the trained weights of the trained recalibration neural network 102 and the trained anomaly detector 104 for each client neural network 22.

If the recalibration neural network 102 and anomaly detector 104 have been trained for a given client neural network 22, and the client neural network 22 is subsequently updated (e.g., retrained using an updated training dataset 24), then the minority-class mining service 100 performs the operations of the training phase to retrain the recalibration neural network 102 and anomaly detector 104 using activations from the updated client neural network 22.

In various examples, the present disclosure has described methods and systems for mining minority-class data samples, which may help to improve a training dataset for training a neural network, thus improving the performance of the trained neural network. The disclosed methods and systems enable information about activation patterns among individual classes to be modeled, and avoid the problem of overfitting, by using a recalibration neural network (e.g., a single-layer recalibration neural network) and modelling the entire distribution of activations using an anomaly detector (e.g., an autoencoder). Some drawbacks in existing uncertainty sampling techniques have been addressed by the use of the recalibration neural network to recalibrate subdued activations, and by the use of an anomaly detector to model the entire distribution of activations by a one-class learning process. The disclosed methods and systems may have relatively low computational cost, because the activation representing a data sample processed in a single pass through the recalibration neural network and anomaly detector.

In various examples, the present disclosure has described methods and systems that enables better identification of candidate minority-class data samples (e.g., having better precision and better recall, in data with highly skewed class distributions), compared to some existing methods and systems such as uncertainty sample, guided learning, and hybrid approaches. The disclosed methods and systems may be implemented with relatively low computational cost (e.g., requiring lower memory resources and/or computing time) compared to some existing methods and systems such as hybrid approaches. The disclosed methods and systems may be implemented with relatively low financial cost compared to some existing methods and systems such as guided learning. The disclosed methods and systems may be applicable to a greater variety of data domains and data complexity, compared to some existing methods and systems such as guided learning and hybrid approaches.

The disclosed methods and systems make use of a trained recalibration neural network and a trained anomaly detector, which may enable the activations of an inner-layer (e.g., penultimate layer) of a client neural network to be modeled, including patterns of activation among individual class activations. In particular, the disclosed methods and systems may address at least some ways in which uncertainty sampling fails to mine minority-class examples, such as the problems of subdued minority-class activations due to class-imbalance and loss of information due to the use of a single scalar hardcoded metric to represent the probability distribution of activations. The recalibration neural network enables distorted class activations of the client neural network to be recalibrated, to avoid distorted activations of minority-classes. The use of a trained anomaly detector may be considered an approach that is more tuned to the specific training dataset of the client neural network, rather than the use of a hard-coded metric (e.g., entropy or max score). The trained anomaly detector may enable the entire probability distribution of activations to be model (or internalized), to capture patterns and relationships among individual class-activations.

For example, the disclosed methods and systems may be useful for improving performance of trained neural networks in the field of medical diagnosis. The distribution of diseases often follows a long-tail pattern, where the rarest disease instances are often quite dangerous and elusive. This results in underrepresentation of these diseases in most training datasets. A client neural network that is trained on such unbalanced training dataset may be biased and perform sub-optimally for the detection of rare diseases. The disclosed methods and systems may enable identification of rare-disease data samples automatically, to enable labeling of these data samples and rebalancing of the training dataset.

In another example, the disclosed methods and systems may be useful for improving the performance of trained neural networks for detecting offensive and sensitive content in media, and particularly online media (e.g., in online social media and online communities). There is typically a much larger proportion of inoffensive content compared to offensive content. However, the offensive nature of the offensive content may require the trained neural network to be well-trained to detect such content to enable removal of offensive content as soon as possible. The disclosed methods and systems may enable automatic identification of offensive content data samples, to provide a balanced training dataset for training a client neural network for detecting offensive content.

The disclosed methods and systems may be useful in any other technical field (e.g., fraud detection, spam detection, etc.) where there is a similar class-imbalance problem in the available data.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method for identifying a candidate minority-class data sample, the method comprising:
receiving an activation comprising values of an inner-layer activation representing a given data sample, the received activation being generated by a client neural network that has been trained to perform a classification;
forward propagating the received activation through a trained recalibration neural network, to generate a recalibrated activation, wherein the trained recalibration neural network has been trained to perform the classification in a manner to avoid overtraining;
forward propagating the recalibrated activation through a trained anomaly detector, wherein the trained anomaly detector has been trained on activations in which majority-class data samples form a majority;
computing a minority-class score for the received activation, based on an anomaly detector output;
identifying the given data sample as a candidate minority-class data sample, based on a comparison of the minority-class score against a minority-class threshold; and
communicating an identification of the given data sample as the candidate minority-class data sample.

2. The method of claim 1, wherein there is a plurality of received activations representing the given data sample, and for each respective received activation of the plurality of received activations the method comprises:
forward propagating the respective received activation through the trained recalibration neural network, to generate a respective recalibrated activation;

forward propagating the respective recalibrated activation through the trained anomaly detector, to generate a respective anomaly detector output; and computing a respective minority-class score for the respective received activation, based on the respective anomaly detector output;

the method further comprising:

filtering and aggregating the respective minority-class scores computed for the plurality of received activations to obtain a single minority-class score to be used in the comparison against the minority-class threshold.

3. The method of claim 1, wherein the trained anomaly detector is a trained autoencoder that has been trained to output a reconstructed activation as the anomaly detector output, and wherein the minority-class score is computed based on a quality of the reconstructed activation.

4. The method of claim 1, wherein the received activation is received from a client computing system, and wherein the minority-class threshold is received from the client computing system.

5. The method of claim 1, wherein the identification of the given data sample as the candidate minority-class data sample is communicated to the client computing system.

6. The method of claim 1, wherein the identification of the given data sample as the candidate minority-class data sample is communicated to a labeling service.

7. The method of claim 1, wherein the trained anomaly detector is a trained autoencoder that has been trained to perform a reconstruction task, wherein the anomaly detector output is a reconstructed activation, and wherein computing the minority-class score comprises:

computing a mean square error between the received activation and the reconstructed activation, wherein the computed mean square error is used as the minority-class score.

8. The method of claim 7, wherein a softmax function is applied to the received activation and to the reconstructed activation, prior to computing the mean square error.

9. The method of claim 1, further comprising training the recalibration neural network and the anomaly detector, wherein the anomaly detector is an autoencoder, by:

receiving a set of inner-layer activations generated by the client neural network, and a set of corresponding class labels, each class label being associated with a respective inner-layer activation;

training the recalibration neural network using a subset of training activations, from the set of inner-layer activations, by:

for each training activation, forward propagating the training activation through the recalibration neural network to generate a predicted class label;

computing a focal loss using the predicted class label, the corresponding class label associated with the training activation, and a focal loss function; and updating weights of the recalibration neural network by backpropagating the computed focal loss;

training the autoencoder using a set of recalibrated training activations generated by the recalibration neural network from the subset of training activations, by:

for each recalibrated training activation, forward propagating the recalibrated training activation through the autoencoder to generate a reconstructed training activation;

computing a reconstruction loss using the reconstructed training activation, the recalibrated training activation, and a reconstruction loss function; and updating weights of the autoencoder by backpropagating the computed reconstruction loss.

10. The method of claim 9, wherein training of the recalibration neural network is performed for a reduced number of epochs compared to training of the client neural network.

11. The method of claim 9, further comprising computing the minority-class threshold by:

forward propagating a subset of validation activations, from the set of inner-layer activations, through the trained recalibration neural network and the trained autoencoder to obtain a set of reconstructed validation activations;

computing a set of minority-class scores based on quality of reconstruction of the set of reconstructed validation activations;

pairing each minority-class score with a corresponding class label; and identifying, from the pairings, a numerical value for the minority-class threshold representing a boundary between the minority-class score for a minority-class data sample and the minority-class score for a majority-class data sample.

12. The method of claim 11, wherein the computed minority-class threshold is communicated to a client computing system.

13. A computing system for identifying a candidate minority-class data sample, the computing system comprising:

a processing device configured to execute instructions to cause the computing system to:

receive an activation comprising values of an inner-layer activation representing a given data sample, the received activation being generated by a client neural network that has been trained to perform a classification;

forward propagate the received activation through a trained recalibration neural network, to generate a recalibrated activation, wherein the trained recalibration neural network has been trained to perform the classification in a manner to avoid overtraining;

forward propagate the recalibrated activation through a trained anomaly detector, wherein the trained anomaly detector has been trained on activations in which majority-class data samples form a majority;

compute a minority-class score for the received activation, based on an anomaly detector output;

identify the given data sample as a candidate minority-class data sample, based on a comparison of the minority-class score against a minority-class threshold; and communicate an identification of the given data sample as the candidate minority-class data sample.

14. The computing system of claim 13, wherein there is a plurality of received activations representing the given data sample, and the instructions cause the computing system to, for each respective received activation of the plurality of received activations:

forward propagate the respective received activation through the trained recalibration neural network, to generate a respective recalibrated activation;

forward propagate the respective recalibrated activation through the trained anomaly detector, to generate a respective anomaly detector output; and compute a respective minority-class score for the respective received activation, based on the respective anomaly detector output;

the instructions further causing the computing system to:
filter and aggregate the respective minority-class scores computed for the plurality of received activations to obtain a single minority-class score to be used in the comparison against the minority-class threshold.

15. The computing system of claim 13, wherein the trained anomaly detector is a trained autoencoder that has been trained to output a reconstructed activation as the anomaly detector output, and wherein the minority-class score is computed based on a quality of the reconstructed activation.

16. The computing system of claim 13, wherein the trained anomaly detector is a trained autoencoder that has been trained to perform a reconstruction task, wherein the anomaly detector output is a reconstructed activation, and wherein the instructions cause the computing system to compute the minority-class score by:
computing a mean square error between the received activation and the reconstructed activation, wherein the computed mean square error is used as the minority-class score.

17. The computing system of claim 13, wherein the instructions cause the computing system to train the recalibration neural network and the anomaly detector, wherein the anomaly detector is an autoencoder, by:
receiving a set of inner-layer activations generated by the client neural network, and a set of corresponding class labels, each class label being associated with a respective inner-layer activation;
training the recalibration neural network using a subset of training activations, from the set of inner-layer activations, by:
for each training activation, forward propagating the training activation through the recalibration neural network to generate a predicted class label;
computing a focal loss using the predicted class label, the corresponding class label associated with the training activation, and a focal loss function; and
updating weights of the recalibration neural network by backpropagating the computed focal loss;
training the autoencoder using a set of recalibrated training activations generated by the recalibration neural network from the subset of training activations, by:
for each recalibrated training activation, forward propagating the recalibrated training activation through the autoencoder to generate a reconstructed training activation;
computing a reconstruction loss using the reconstructed training activation, the recalibrated training activation, and a reconstruction loss function; and
updating weights of the autoencoder by backpropagating the computed reconstruction loss.

18. The computing system of claim 13, wherein the computing system is one of:
a server;
a server cluster; or
a cloud computing platform.

19. A non-transitory computer-readable medium having instructions encoded thereon, wherein the instructions, when executed by a processing device of a computing system, cause the computing system to:
receive an activation comprising values of an inner-layer activation representing a given data sample, the received activation being generated by a client neural network that has been trained to perform a classification;
forward propagate the received activation through a trained recalibration neural network, to generate a recalibrated activation, wherein the trained recalibration neural network has been trained to perform the classification in a manner to avoid overtraining;
forward propagate the recalibrated activation through a trained anomaly detector, wherein the trained anomaly detector has been trained on activations in which majority-class data samples form a majority;
compute a minority-class score for the received activation, based on an anomaly detector output;
identify the given data sample as a candidate minority-class data sample, based on a comparison of the minority-class score against a minority-class threshold; and
communicate an identification of the given data sample as the candidate minority-class data sample.

20. The non-transitory computer-readable medium of claim 19, wherein the trained anomaly detector is a trained autoencoder that has been trained to output a reconstructed activation as the anomaly detector output, and wherein the minority-class score is computed based on a quality of the reconstructed activation.

* * * * *